Dec. 13, 1949   J. W. ASPENLEITER   2,491,071
SHOE MEMBER FOR SEMIRIMLESS
TENSION SPECTACLE MOUNTINGS
Filed Feb. 27, 1948
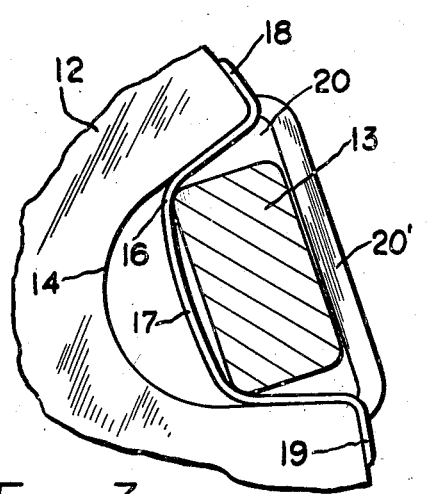
FIG. 3
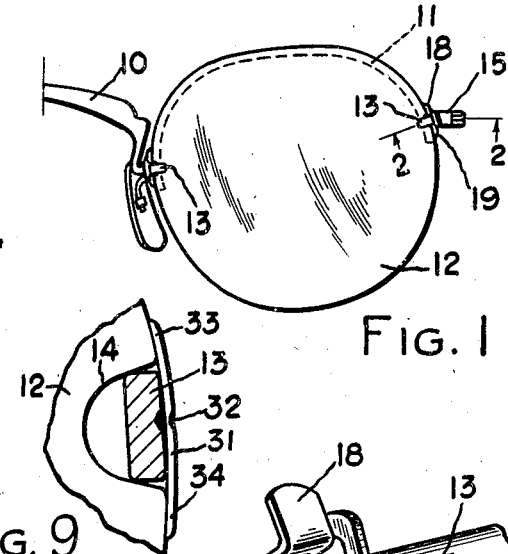
FIG. 1
FIG. 9
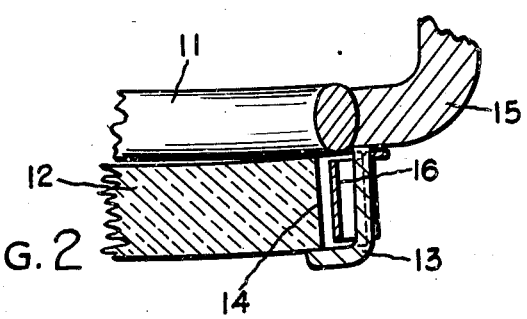
FIG. 2
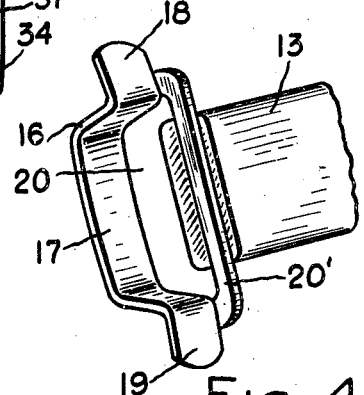
FIG. 4
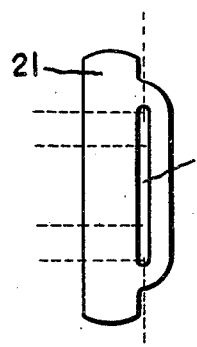
FIG. 5
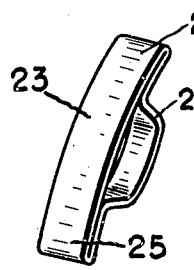
FIG. 6
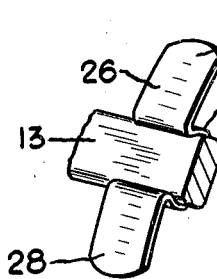
FIG. 7
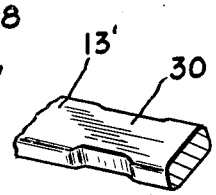
FIG. 8
Inventor
JOSEPH W. ASPENLEITER
By  *H. A. Ellestad*
Attorney Patented Dec. 13, 1949

2,491,071

UNITED STATES PATENT OFFICE 2,491,071

SHOE MEMBER FOR SEMIRIMLESS TENSION SPECTACLE MOUNTINGS

Joseph W. Aspenleiter, Caledonia, N. Y., assignor to Bausch & Lomb Optical Company, Rochester, N. Y., a corporation of New York Application February 27, 1948, Serial No. 11,736

4 Claims. (Cl. 88—47)

1

This invention relates to ophthalmic mountings and more particularly it has reference to a semi-rimless type of spectacle mounting wherein the lenses are held by arms which engage notches formed in the edges of the lenses.

In one mounting of the type described, a resilient frame member extends laterally from the bridge and rearwardly of and along the nasal, top and temporal portions of the edge of the lens. Flexible arms extending forwardly from the nasal and temporal portions of the frame are located in notches formed in the nasal and temporal edges of the lens and have their ends bent over to engage the front surface of the lens. The resilience of the frame member serves to hold the arms in the notches so that the lens may be inserted or removed by spreading the ends of the frame member which carry the arms.

In the construction which has just been described, the arms bear directly against the walls of the notches formed in the edges of the lenses. In forming the notches in the lenses, minute cracks or fissures may develop adjacent the walls of the notches so that pressure of the arms on these points may cause the lenses to crack or chip. Furthermore, if the notches are not formed with a uniform depth, the arms will not be positioned at uniform distances from the edges of the lenses and hence the frame members will not closely follow the contours of the lenses.

An object of the present invention is to overcome these difficulties in an ophthalmic mounting of the type described. A further object is to provide in a mounting of the type described means for distributing the pressure of the arms against the lens. Another object is to provide in such a mounting a resilient shoe member which is mounted on the arm so as to provide a cushioning means between the arm and the lens. Still another object is to provide a shoe member which may be detachably mounted on the arm of such a mounting so that the pressure of the arm against the lens will be exerted on the wall of the notch and the edge of the lens. A further object is to provide in such a mounting a shoe member which is fixedly secured to the arm and adapted to engage the edge of the lens adjacent the notch whereby the arm will be limited in its movement into the notch.

These and other objects and advantages reside in certain novel features of construction, arrangement and combination of parts as will hereinafter be more fully described and pointed out in the appended claims.

2

Referring to the drawings:

Fig. 1 is a fragmentary front view of a spectacle embodying my invention.

Fig. 2 is an enlarged sectional view taken on line 2—2 of Fig. 1.

Fig. 3 is an enlarged detail view showing the arm and shoe member located in the notch in the lens.

Fig. 4 is a view showing the shoe member and arm in separated relation.

Fig. 5 is a plan view of a blank which is formed to provide the shoe member.

Fig. 6 is a perspective view of a modified form of the shoe member.

Fig. 7 is a perspective view of a further modification of the shoe member showing it mounted on the arm.

Fig. 8 is a modified form of arm for receiving the shoe member.

Fig. 9 is a fragmentary view showing another modification of the shoe member and its relation to the arm and notch in the lens.

A preferred embodiment of the invention is shown in Figs. 1–5 wherein 10 indicates a bridge to which is secured a laterally projecting resilient frame member 11 which extends along the nasal, top and temporal edges on the rear side of lens 12. Projecting forwardly from the nasal and temporal portions of frame member 11 are the flexible arms 13 which are positioned within notches 14 formed in the nasal and temporal edges of the lens 12. The usual endpiece 15, for pivotally supporting a temple, is soldered to the temporal portion of frame member 11.

The resilient shoe member 16 has a re-entrant portion 17 which is positioned within the notch 14 between the wall of the notch and the arm 13 as shown in Fig. 3. The shoe member 16 also has the integral portions 18 and 19 which extend, respectively, above and below the notch 14 and in contact with the edge of the lens 12. The shoe member 16 is mounted on the arm 13 by sliding the former over the free end of the latter so that the end of the arm passes through the slot 20 formed in the shoe member 16.

The shoe member 16 is preferably made from a blank 21 of resilient sheet material of the form shown in Fig. 5 as having a closed slot 22. When the blank is formed along the dotted lines shown in Fig. 5, the shoe member 16 is produced. In the forming operation, the material adjacent the slot 22 is expanded so as to provide the wider slot 20 for receiving the end of the arm 13 as shown in Fig. 4.

A modified form of shoe member 23, shown in Fig. 6, is made by forming a piece of metal tubing so as to provide the re-entrant portion 24 and the integral upper and lower portions 25 for engaging the edge of the lens above and below the notch formed therein. The re-entrant portion 24 provides an opening so that the shoe member 23 may be slid over the free end of the arm 13 in a manner similar to that employed in mounting the shoe member 16. A further modification of the shoe member, shown at 26 in Fig. 7, is formed of a single flat strip of resilient material to provide a re-entrant portion 27 and the upper and lower portions 28 for engaging the edge of the lens adjacent the notch. The throat of the re-entrant portion 27 is narrower than the width of the arm 13 so that the shoe member is mounted on the arm by forcing the member over the arm as shown in Fig. 7. In order to further facilitate the mounting of the shoe members on the arm, the latter may be modified as shown in Fig. 8 to provide the arm 13' having a reduced neck portion 30 for holding the shoe member and preventing its accidental movement along the arm.

A further modification of the shoe member, shown in Fig. 9, comprises a metal strip 31 which is fixedly secured to the arm 13 at 32 by any suitable means such as welding, soldering or riveting. While the metal strip 31 may be resilient, it should be stiff enough to limit the movement of the arm 13 into the notch 14. It will be understood, of course, that the arm 13 is urged into the notch 14 by the resilience of the relatively stiff frame member 11. The end portions 33 and 34 of the shoe member 31 will be urged into contact with the edge of the lens and so act as a limiting stop to position the arm 13 at a uniform distance from the edge of the lens, even though some of the notches may be deeper than others.

Any of the shoe members, except that shown in Fig. 9, may be detachably mounted on the arm 13. This operation may be readily performed by the optical technician without the use of any special tools. After the shoe member 16 has been slid in place on the arm 13, the part 20' may be pressed into contact with the arm by means of a plier so that the shoe member 16 will be held in place on the arm by the friction and resilience of the parts.

As clearly shown in Fig. 3, the shoe member 16 will engage the wall of the notch 14 so that the arm 13 is resiliently held in position. It will be understood, of course, that the arms 13 are secured to the nasal and temporal parts of the resilient frame member 11 so that the arms 13 are held against the shoe member by the resilience of the relatively stiff frame member. Since the portions 18 and 19 engage the edge of the lens 12, it will be apparent that the pressure of the arm 13 against the lens will be distributed so that a part of it is carried by the wall of the notch in the lens and part of it is borne by the edge of the lens above and below the notch.

The shoe member 16 also serves to position the arm 13 within the notch 14 since the shoe member limits the movement of the arm into the notch. Accordingly, the arms are always positioned at a uniform distance from the edges of the lenses even though the notches may be formed with different depths. Since the arms are secured to the resilient frame member 11, the shoe member 16 will insure the proper location of the frame member relative to the edge of the lens.

It will be apparent, therefore, that the shoe member will afford a resilient connection between the lens and the arm which is urged towards the lens by the resilience of the relatively stiff frame member. In the past, it has been proposed to slip a yieldable, soft plastic tubing over the arm, but such a device has not been satisfactory. Moreover, the shoe member embodying my invention also tends to further reduce lens breakage because part of the pressure of the arm is distributed to the edge of the lens. The use of my shoe member will, accordingly, greatly facilitate the assembly of lenses to such a type of mounting and enable the technician to produce a neat appearing, efficient structure.

From the foregoing it will be apparent that I am able to attain the objects of my invention and provide an improved shoe member for semi-rimless spectacle mountings of the type wherein the lenses are held by arms which are yieldably held in notches formed in the edges of the lenses. Various modifications may obviously be made without departing from the spirit of my invention as pointed out in the appended claims.

I claim:

1. In an ophthalmic mounting, the combination of a lens having a notch formed in its edge, a resilient shoe member having portions extending along the edge of the lens above and below the notch, said shoe member also having a re-entrant portion positioned in the notch and in engagement with the wall thereof, a frame member, an arm secured to the frame member, said shoe member being mounted on the arm, said arm being positioned in the notch and in engagement with the re-entrant portion of the shoe member whereby the arm is resiliently supported in the notch.

2. In an ophthalmic mounting having a resilient frame member positioned rearwardly of the edge of a lens having a notch and an arm extending forwardly from the frame member, the combination of a resilient shoe member mounted on said arm and having a portion located within the notch and in contact with the wall thereof, said shoe member also having portions extending, respectively, along the edge of the lens above and below the notch, said arm being positioned within the notch and urged against the shoe member by the resilience of the frame member whereby the shoe member is held against the wall of the notch and the edge of the lens.

3. In an ophthalmic mounting having a resilient frame member positioned rearwardly of the edge of a lens having a notch and an arm extending forwardly from the frame member, the combination of a resilient shoe member mounted on said arm and having a portion located within the notch and in contact with the wall thereof, said shoe member also having portions extending, respectively, along the edge of the lens above and below the notch, said arm being positioned within the notch and urged against the shoe member by the resilience of the frame member whereby the shoe member is held against the wall of the notch and the edge of the lens, said shoe member having an opening formed therein, said arm extending through the opening whereby the shoe member is detachably mounted on the arm.

4. In an ophthalmic mounting, the combination of a lens having notches formed in its nasal and temporal edges, a bridge, a resilient frame member secured to the bridge and extending rearwardly of and along the nasal, top and temporal edges of the lens, flexible arms secured, respectively, to the nasal and temporal portions of the frame member and extending forwardly into the respective notches, a resilient shoe member mounted on each arm, each shoe member having portions engaging the edge of the lens on opposite sides of the notch, each shoe member also having a re-entrant portion which is located within the adjacent notch between the arm and the wall of the notch, the resilience of the frame member urging the arm into contact with the re-entrant portion of the shoe member.

JOSEPH W. ASPENLEITER.

REFERENCES CITED

The following references are of record in the file of this patent:

UNITED STATES PATENTS

| Number | Name | Date |
|---|---|---|
| 1,538,338 | Hodny | May 19, 1925 |
| 2,208,103 | Paterson | July 16, 1940 |
| 2,257,812 | Pomeranz | Oct. 7, 1941 |
| 2,277,118 | Leavitt | Mar. 24, 1942 |
| 2,352,729 | Metzger | July 4, 1944 |
| 2,383,572 | Splaine et al. | Aug. 28, 1945 |
| 2,439,357 | Bouchard | Apr. 16, 1948 |